Figure 1:
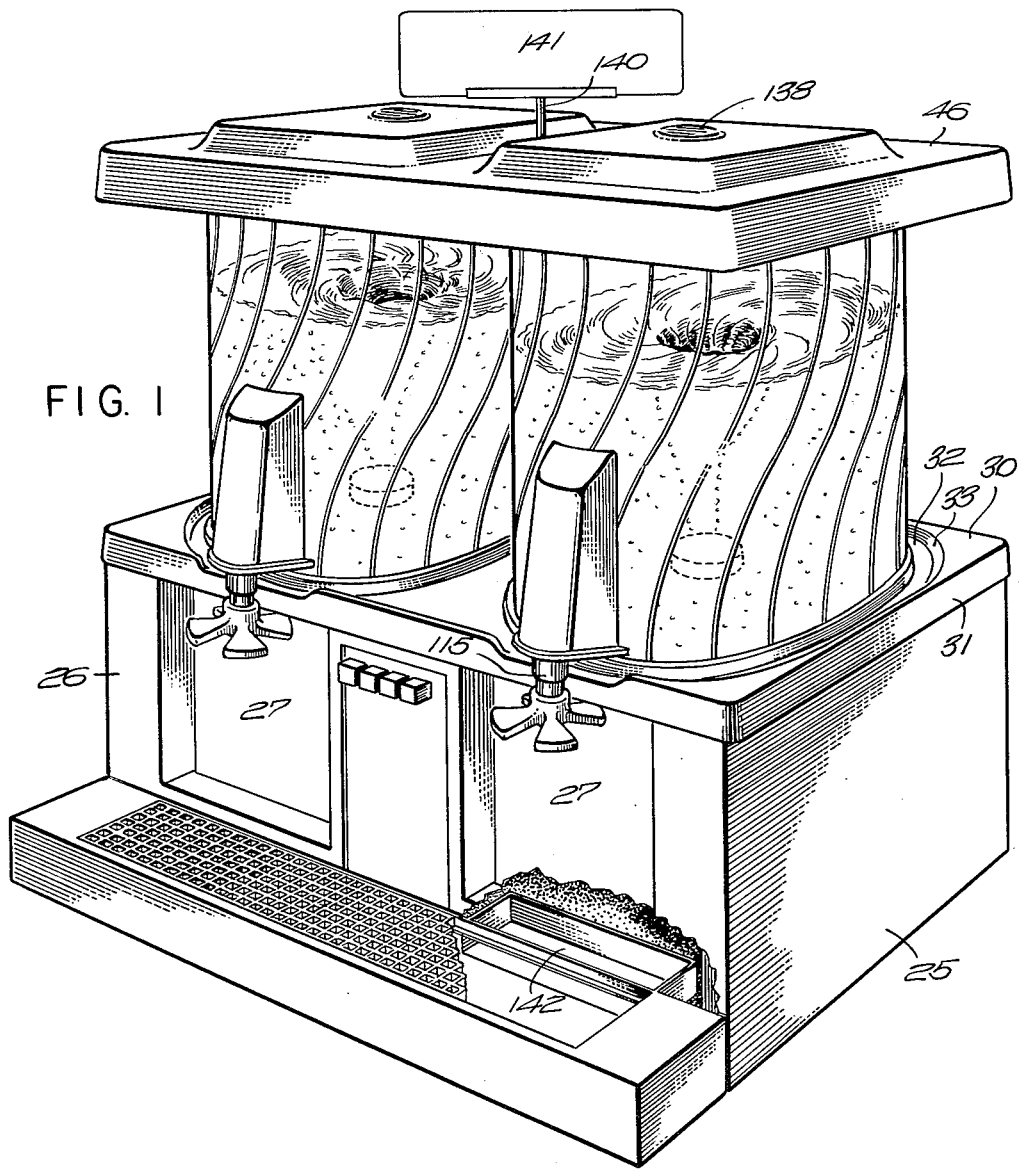

Oct. 30, 1962 F. J. PRICE, JR 3,060,702
REFRIGERATED BEVERAGE DISPENSER
Filed April 1, 1959 6 Sheets-Sheet 1

INVENTOR.
FREDERICK J. PRICE, JR
BY
Barlow & Barlow
ATTORNEYS

Oct. 30, 1962 F. J. PRICE, JR 3,060,702
REFRIGERATED BEVERAGE DISPENSER
Filed April 1, 1959

INVENTOR.
FREDERICK J. PRICE, JR.
BY
Barlow & Barlow
ATTORNEYS

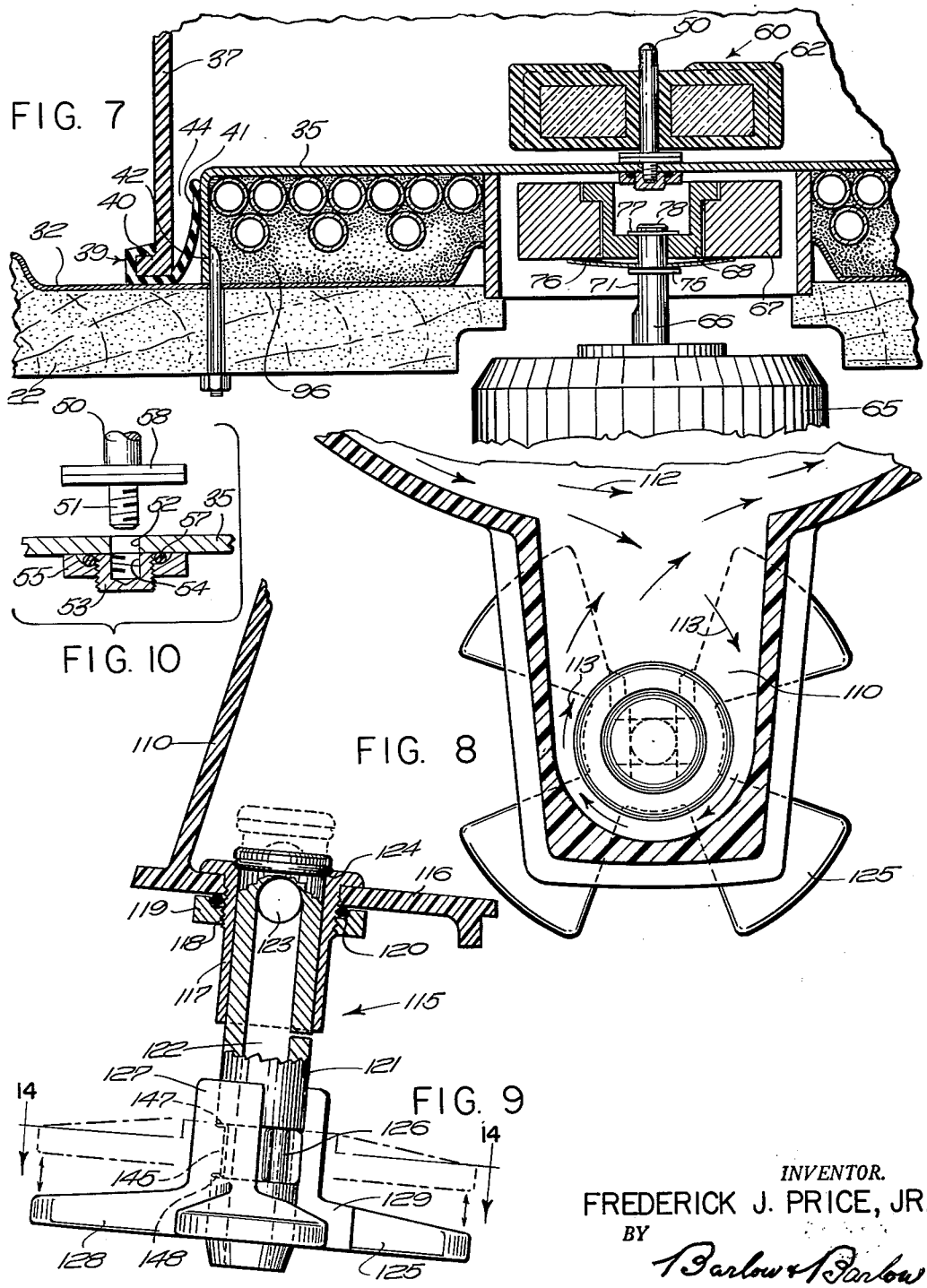

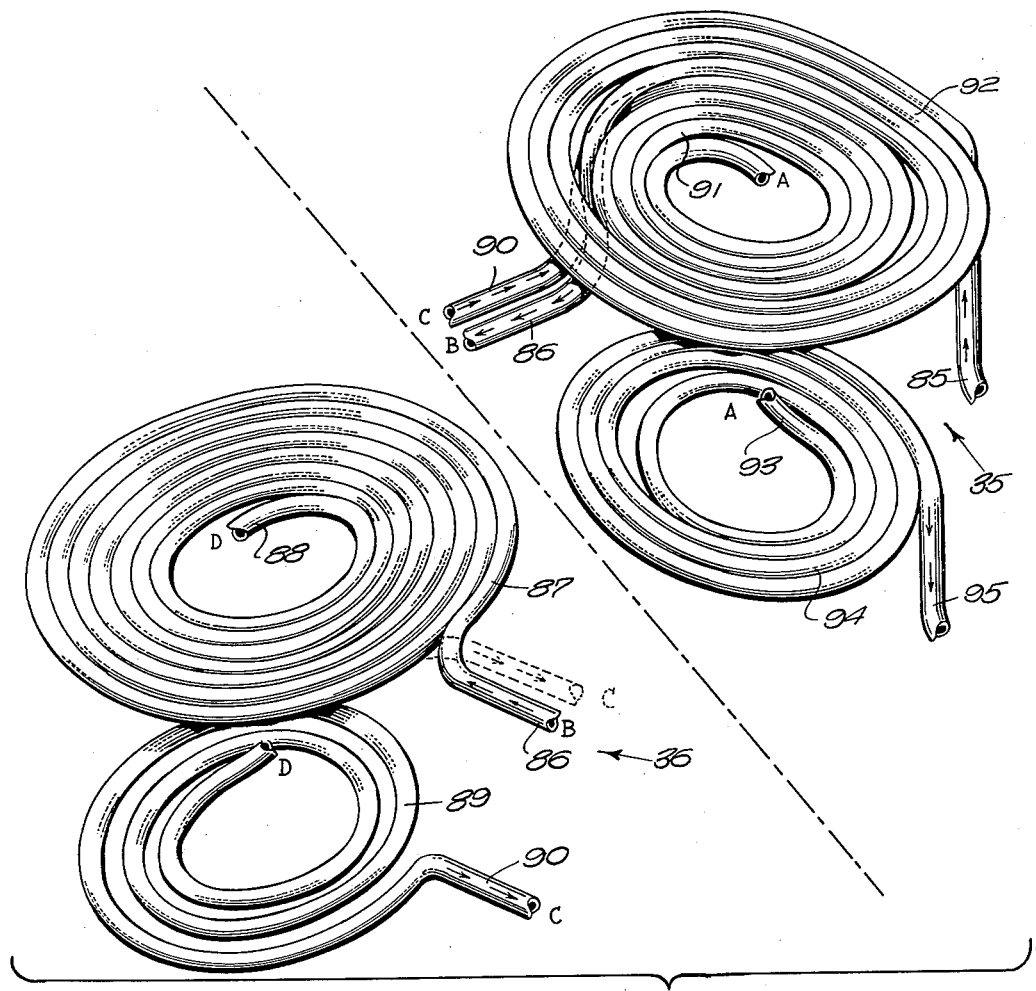
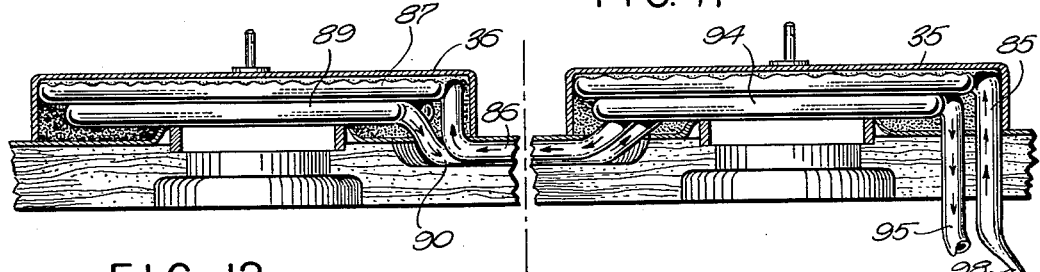
FIG. 11
FIG. 12
INVENTOR.
FREDERICK J. PRICE, JR.
BY
*Barlow & Barlow*
ATTORNEYS Oct. 30, 1962 F. J. PRICE, JR 3,060,702
REFRIGERATED BEVERAGE DISPENSER
Filed April 1, 1959 6 Sheets-Sheet 6

*INVENTOR.*
FREDERICK J. PRICE, JR.
BY
*Barlow & Barlow*
ATTORNEYS 3,060,702
REFRIGERATED BEVERAGE DISPENSER
Frederick J. Price, Jr., Saugus, Mass., assignor to
Samuel Dane, Brookline, Mass.
Filed Apr. 1, 1959, Ser. No. 803,400
4 Claims. (Cl. 62—392)

This invention relates to a refrigerated beverage dispenser.

One of the objects of this invention is to provide for agitation of the liquid beverage to be dispensed in such a manner that there will be no settling out of solid particles carried by the beverage nor will there be a collection of these solid particles at any point within the tank.

Another object of this invention is to provide a tank so shaped that swirling of liquid in the tank will serve to mix the liquid therein thoroughly.

Another object of the invention is to provide a tank having portions so shaped that there will be a reverse eddy or a counterflow in a portion of the tank so as to achieve better mixing.

Another object of this invention is to provide an arrangement so that the liquid will be drawn from a portion of the tank having the greatest agitation or mixing so that the liquid will be well mixed and cool at the dispensing location.

Another object of the invention is to cause the liquid swirl across the heat exchange or refrigerated portion of the tank so that the liquid will be maintained in continuous motion across this refrigerated portion and will be prevented from freezing as might occur were it static at this portion.

Another object of the invention is to provide a swirling of the liquid so that it will wipe the entire refrigerated portion or heat exchange portion of the tank.

Another object of this invention is to provide a plurality of tanks and to have a single continuous conduit for refrigerating two or more tanks with an arrangement of the conduit so that both tanks will be refrigerated to substantially the same temperature without any separate valving means.

Another object of this invention is to attain substantially uniform refrigeration in a plurality of tanks by dividing the conduit in such a way that it will naturally have a balanced relation for maintaining equal temperatures in the plurality of tanks.

Another object of this invention is to provide a top casing carrying electrical mechanism which may be easily removed for filling or cleaning the liquid tanks and easily replaced in position without tools.

Another object of this invention is to provide a condenser formed of layers of tubing which are to be cooled without the use of fins on the tubes by disposing the stretches of the tubing in such a way that air passed thereover will effectively cool the tubing.

Another object of the invention is to utilize the air which is passed over the tubes to be cooled for also cooling other mechanical parts which are used to operate the cold drink dispenser.

Another object of the invention is to provide tanks which are transparent and to light the content of those tanks in such a way so as to enhance their appearance and at the same time to so insulate the lighting that heat from the light will not be effectively transferred to the tanks.

Another object of this invention is to utilize this lighting means for displaying a sign or the like over or about the tanks.

Another object of this invention is to light these tanks by a focused lamp which will not distribute the light generally but will direct it in a beam into the liquid to be dispensed, thus enhancing its appearance.

With these and other objects in view, the invention consists of certain novel features of construction as will be more fully described and particularly pointed out in the appended claims.

Figure 2:
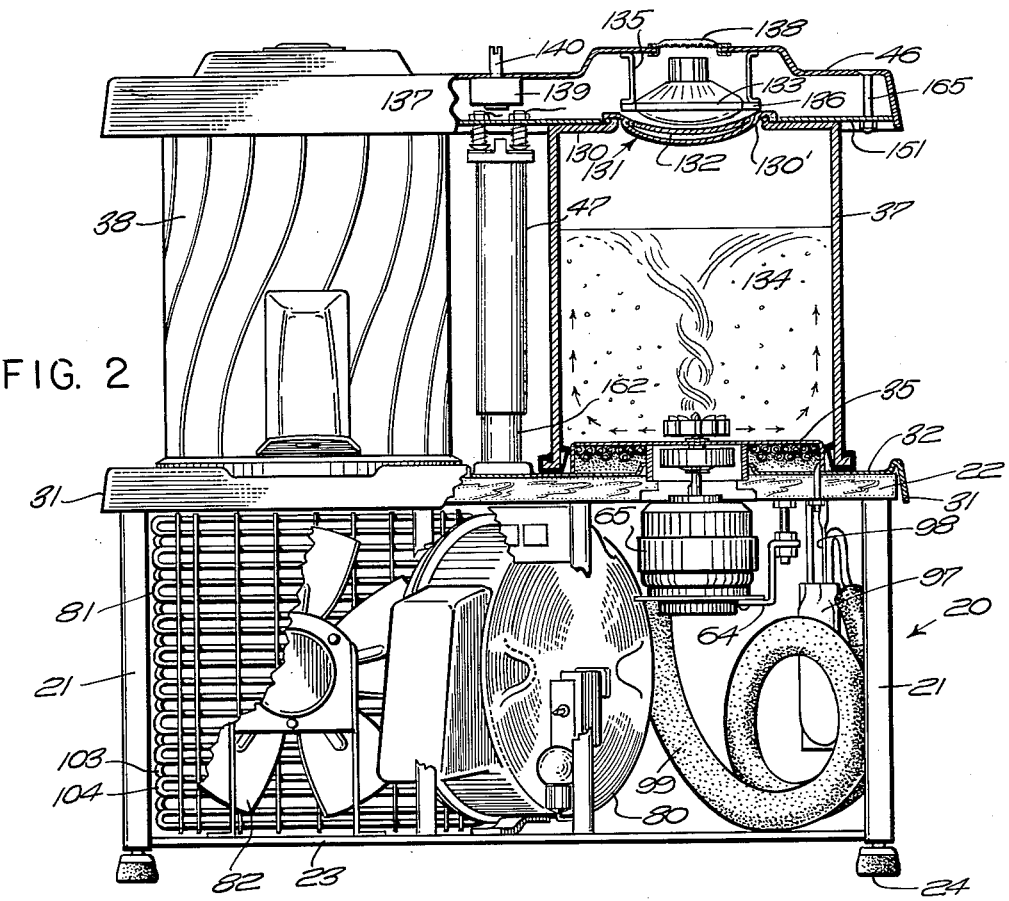
Figure 3:
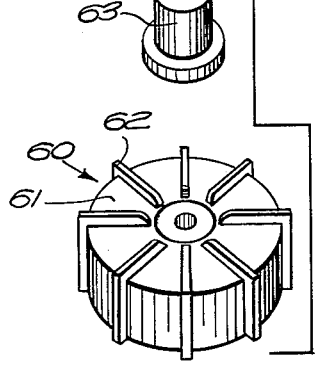
Figure 4:
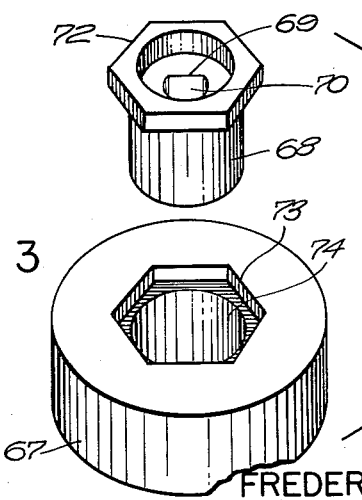
Figure 5:
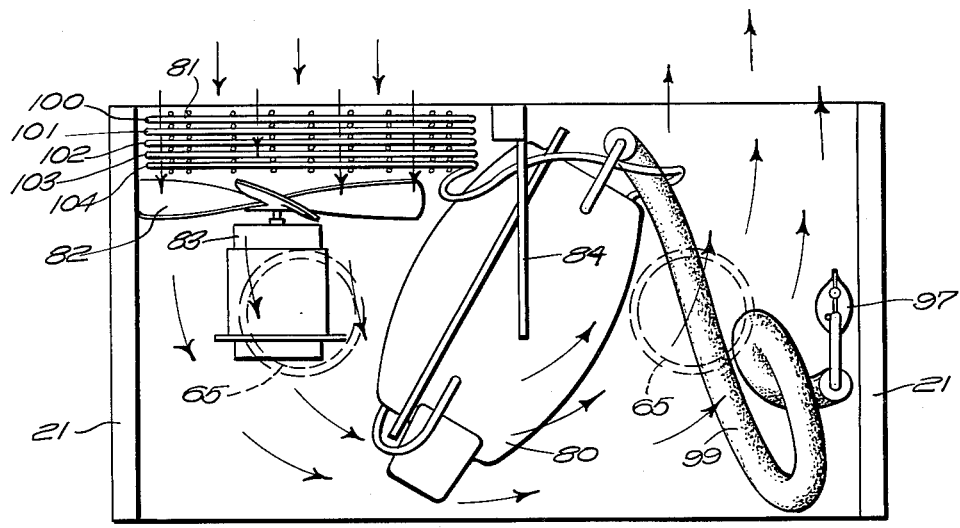
Figure 6:
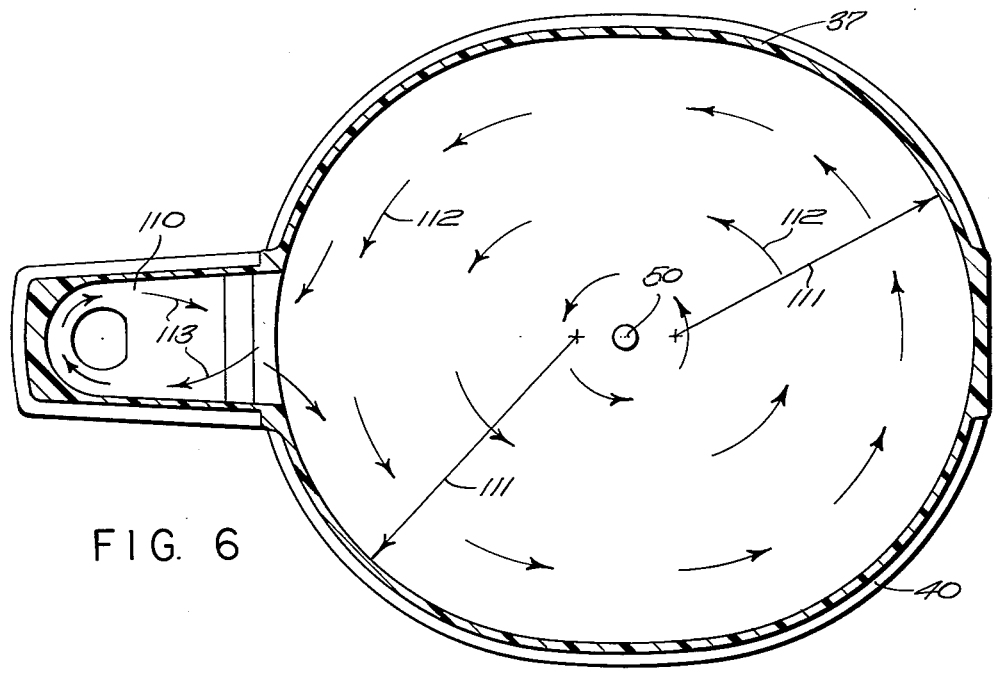
Figure 13:
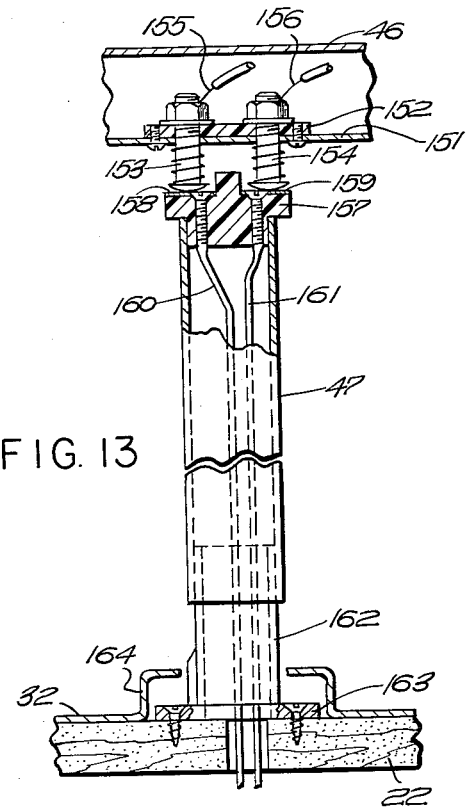
Figure 14:
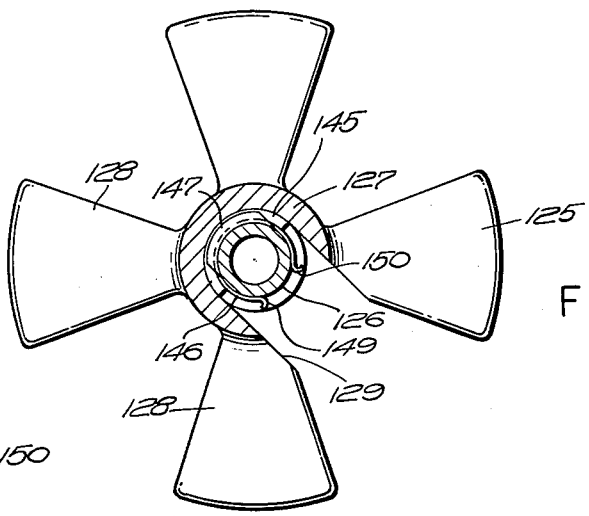
Figure 15:
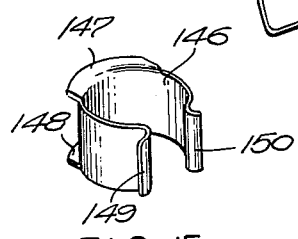

In the accompanying drawings:

FIG. 1 is a perspective view of the dispenser;
FIG. 2 is a partial sectional view;
FIG. 3 is a perspective view of the impeller;
FIGURE 4 is a perspective view of the driving portion of the agitator;
FIG. 5 is a diagrammatic plan view of the operating mechanism;
FIG. 6 is a plan view of one of the tanks;
FIG. 7 is a sectional detail of the lower portion of one of the tanks;
FIG. 8 is a horizontal sectional view through the mixing chamber;
FIG. 9 is a vertical sectional view through the mixing chamber and dispensing valve;
FIG. 10 is a fragmental sectional detail of the spindle mounting;
FIG. 11 is an exploded perspective view somewhat diagrammatic of the heat transfer coils;
FIG. 12 is a sectional view of the cold plate or heat exchange units and the coils therein.
FIG. 13 is an elevation partly in section of the port for the top casing;
FIG. 14 is a section on staggered line 14—14 of FIG. 9; and
FIG. 15 is a perspective view of the spring clip in the valve lifter.

In proceeding with this invention, I have provided a supporting stand upon which two storage tanks are mounted. Mechanism for agitating the tanks and for cooling the tanks is contained in the supporting stand, and a means for lighting the tanks from overhead is supported just above the tanks. The tanks are transparent so that the lighting passes down into the liquid to be dispensed and makes an attractive appearance. The lower or bottom wall of each of the tanks is provided with a refrigerating coil, and the tanks are sealed about this bottom wall or cold plate in such a manner that they may be removed for cleaning. The liquid is agitated by a propelling device within each tank which is magnetically coupled to a driven magnet below the bottom wall of the tank so that necessity for a seal about the agitating means is obviated. The tanks are of a shape so that they will assist in the agitation of the liquids which are contained in them and are generally elliptical or oval with the impeller located at a mid point of the tank. At the end of the ellipse an eddy chamber is formed which, as the liquid swirls around in the tank, causes the liquid to be picked up in this chamber where it will eddy and have a counterflow, thus additionally affording better mixing. Also as the agitation occurs, a vortex is drawn in the liquid which by reason of the shape of the tank shifts between the different focuses of the end curvatures of the tank, and also this vortex serves to give the liquid an outward wiping action from the impeller outwardly to both walls and then upwardly and the upper portion of the liquid folds into the body of the liquid. Thus the refrigerated surface is wiped by the liquid from wall to wall as the agitating action occurs. This enables the liquid to be quickly cooled, more thoroughly cooled and to maintain the cool liquid in a well agitated condition in the eddy chamber, and it is from this eddy chamber that the dispensing of the liquid occurs, thus assuring the most agitated part of the liquid being dispensed. The arrangement is such that any solid parts of the liquid will not collect on any protuberances in the tank.

I also provide in this dispenser a means of cooling both tanks to substantially the same temperature by the use of a single length of tubing which is arranged so that its cooling action will be balanced between the two tanks, this arrangement being provided by locating a short portion of the tube adjacent the refrigerant supply for heat exchange with one tank then traveling the tube to the other tank to place it in heat exchange relation therewith and to then travel the tube back to the first tank and have the end portion of the conduit in further heat exchange relation with the first tank. In this manner by taking the first and last parts of the conduit for one tank and intermediate part for the other tank, I may provide a substantially balanced relation as to heat exchange out of a single continuous conduit without any valving arrangement.

With reference to the drawings 20 designates generally a supporting stand which comprises a frame having upright legs 21 supporting a top wall 22, which may be of wood, and a shelf 23 at the lower portion of the legs providing a tie between the legs. Feet 24 are located at the end of each of the legs to maintain the shelf 23 clear of the supporting surface. Side walls such as 25 and a screen-like back wall are attached to the uprights 21 while a front closure 26, 27 as seen in FIGURE 1 closes the supporting frame.

Upon the wooden top wall 22, there is a covering of sheet plastic 30 which is provided with an end flange 31 extending downwardly about its periphery and at a point spaced inwardly from the periphery there is a depressed portion 32 with a beveled surface 33 leading from the bottom of this depression to the portion 30 as shown in FIGURE 1.

Heat transfer or expansion units 35 and 36 of a refrigerating mechanism, each comprising an inverted pan-shape member, are secured to and rise above the depressed bottom wall 32 and are located in spaced relation (see FIG. 12). These members are each a little smaller but substantially the shape of tanks which are to be positioned over them. A tank 37 telescopes the member 35 in somewhat spaced relation therewith and a tank 38 telescopes the member 36 with its lower edge in somewhat spaced relation therewith. These liquid containing tanks are substantially identical and one only need be described. The tank is sealed to the bottom wall 32 and to a cold plate unit such as 35 by the rubber-like gasket 39, as shown in FIGURE 7, which embraces the flange 40 at the lower edge of the tank, such as 37, with a portion 41 extending upwardly and against the wall 42 of member 35, thus leaving access to the space 44 between the portion 41 and the wall of the tank so that the weight of liquid in the tank will force the wall 41 toward the side wall 42 of the unit 35.

Agitating means are provided for the liquid in each tank by means of a rotary impeller. The impeller for each tank is mounted on a spindle 50 which is mounted in the wall of the unit 35 (FIG. 10) by reason of a threaded lower end 51 which passes through the opening 52 in the member 35 and into a cup 53 internally threaded as at 54 which cup is below the wall of the member 35. This cup is held against the lower surface of the member 35 by a nut 55 which has threaded engagement with the threaded outer surface 56 of the cup and is sealed to the cup and the lower surface of the unit 35 by an O-ring 57. A flange 58 is fixed to the spindle 50 so that as the nut is turned up against the lower surface of the member 35, it will pull on the lower end of the spindle 51 which is threaded into the nut and draw these parts all in snug relation. This enables the spindle to be removed and replaced as occasion should require.

An impeller 60 is mounted for free revolving about this spindle 50. This impeller 60 is generally cylindrical as at 61 with a plurality of vanes 62 extending from its cylindrical and top end surfaces as seen in FIGURE 3 by molding a plastic material about a core. The core is of magnetic material having diammetrically opposite north and south poles and is mounted upon a bushing 63 which will fit upon the spindle 50. This impeller is of a character to be magnetically impelled or driven.

Below each spindle 50 a bracket 64 mounts a motor 65 with its driving shaft 66 axially alined with the spindle 50, and this shaft 66 carries a rotor 67 (FIG. 4) carrying a magnet for magnetically coupling to the impeller 60 so that as the rotor 67 turns, the impeller 60 will be also turned through the magnetic coupling. The rotor 67, as shown in FIGURES 4 and 7, has a hub 68 with a flat portion 69 of the bore 70 which abuts the flat portion 71 of the shaft 66 so as to be driven thereby. This hub 68 has an hexagonal head 72 which will engage the hexagonal recess 73 at the upper end of the bore 74 of the impeller 67 so that this hub will drive the impeller by being mechanically coupled thereto. A circular groove is provided in the shaft 66 which receives a spring ring 75 providing a collar against which the flat spring 76 may engage. The rotor 67 sets upon this flat spring 76 and is held in a position causing tension on the spring by a spring ring 77 seating in a circular recess 78 near the end of shaft 66.

The unit 35 serves as a cold plate or heat transfer portion and housing for the expansion coils of the refrigerating unit which comprises the usually compressor 80, condenser coils 81 and a fan 82 driven by a motor 83 for drawing air across these condenser coils. The compressor 80 is about in the middle of the enclosure below the top wall 22 of the supporting stand. A baffle 84 extends upwardly and downwardly from the compressor at the back side of the stand effectively dividing the area into two parts with an air passage from one to the other at the front. A screen extends along the back side of the stand for the passage of air therethrough.

The refrigerant is conducted to the expansion units 35 and 36 and returned through a continuous unobstructed length of conduit through both of the expansion chambers 35 and 36 without any valving means between. The conduit is shown in FIGURE 11 as entering the expansion unit 35 at 85 and there making about three and a half turns 92 with a portion 86 (FIG. 12) then leaving the unit 35 and extending as indicated at B—B (FIG. 11) to the unit 36 where it is coiled as at 87 spirally about 8 turns and then extends as shown at D and 88 (FIG. 11) to provide substantially three and a half coils 89 just below the layer of coils 87. Thence the conduit as at C and 90 (FIG. 11) extends back to expansion unit 35, the bights 90 being connected as at C—C where a further three coils 91 are provided in a plane with the coils 92 first formed and then the conduit extends as at 93 A—A to another layer of coils where a little over three coils more 94 are provided and the conduit at 95 returns to the compressor. These coils are all secured together and to the sheet metal top wall of units 35 and 36 by solder. A mastic of insulation such as glass fibers or cork composition 96 is placed about these coils.

By reason of this coiling arrangement as there is continually a heat transfer between the first portion of the conduit in the expansion chambers, the middle portion and the leaving portion of the conduit from the expansion chambers, there will be a continuing lessening effect in heat transfer between the points 85 and 95. Thus by taking a part of the rapid heat transfer at the beginning and combining it with a part of the lesser heat transfer at the end for one expansion unit and providing an intermediate portion between these two ends in the other expansion unit, I may provide a balanced relation by selecting the amount of coils in each expansion unit so that substantially the same thermal temperature may be had in each expansion chamber, and thus I may provide a single conduit without valving means for controlling two or even by a similar division more expansion chambers all driven from a single refrigeration unit. The feed of refrigerant to these coils is through a surge chamber 97 and metering capillary tube 98 covered by a conduit 99.

The condenser designated generally 81 in FIGURE 2 in this particular instance is shown as a coil without any fins. The tube containing the liquid refrigerant is divided into a plurality of layers 100, 101, 102, 103, 104 (FIG. 5) and in each layer the tube is folded back and forth into a plurality of stretches. These layers are so arranged that the stretches of conduit in layer 101 are staggered with relation to the stretches of conduit in layer 100 or 102 and so forth so that air which passes across these conduits has to pass in a tortious manner back and forth striking first a conduit in one layer and then a conduit in another layer, and in this manner the passage of air for cooling becomes more effective than where channeling in a straight path might occur.

The air is drawn across these cooling stretches of conduit by the fan 82, FIG. 5. This fan draws in from one surface of the stand such for instance as the back of the stand and then by reason of a baffle 84 and the compressor, the air is conveyed in a half-circular form across the compressor 80 and discharged on the back of the stand as seen by the arrows FIG. 5. In this air path there is also located the fan motor 83 and both motors 65. By this arrangement the air serves to cool first the cooling coils 81 then the motor beneath the expansion unit 36 and the fan motor 83, then the compressor and then the motor 65 beneath the expansion unit 35 and is discharged on the same side of the stand as it entered.

Each of the tanks 37 and 38 are oval in horizontal cross-section and are shaped as shown in FIG. 6. The end arcs are the same radius 111 and the distance between their centers is in the vicinity of one third of their radius. From one of these arcs there protrudes outwardly an eddy chamber 110 providing for a greater turbulence. The area 110 is located on the center line of the oval. The impeller 60 is on the spindle 50 midway between the centers of arcs 111. Each impeller serves to swirl the liquid in the tank circularly about the tank which will be in a direction to take advantage of the earth's rotation and as seen in FIG. 6 is counter clockwise in the main portion of the tank as seen by arrows 112. This rotation of the liquid as the speed of rotation increases will cause a vortex to be created extending down through the center of the tank toward the impeller. When the vortex touches the impeller air will be drawn into the liquid. By predetermining the oval tank dimension as to arc radius and depth and the size and speed of the impeller, the vortex may be held to a predetermined shape and cause the liquid to be folded or whipped into itself and thus blended in a way to control the foam or froth and prevent the foam collecting above the liquid level. At times this vortex will travel from the center toward either end of the oval tank. These motions give the liquid a sweeping motion over the heat exchange units 35 and 36 and also the liquid is given a motion from bottom to top along the side walls of the tank which serves to mix the liquid and keep any solid particles that might be in there, such as pulp of orange or other fruit juice, from settling out and as the inside walls of the container are substantially rounded and smooth, there will be no catching of any solid particles on the walls of the tank. This swirling action of the liquid is such that there is a centrifugal force exerted outwardly on the side of the tank and as the liquid arrives at the eddy area 110, the liquid will swirl in the opposite direction and move as shown by the line of arrows 113, FIGS. 6 and 8, or provide an eddy current as it might be termed in this chamber 110. With a greater turbulence and more intense mixing, this chamber is curved along its surface so that no solid particles will catch along the surface, and as the eddy occurs, a better mixing of the entire liquid will also occur, and it is from this area in the chamber 110 that I draw or dispense the liquid to be used.

The dispensing is through a valve designated generally 115 shown in FIGURE 9. Through the lower wall 116 of this chamber 111, I provide a tube 117 which has threads 118 on its outer surface and is secured by means of a nut 119 and O-ring 120 as the nut engages the lower surface 116 of the chamber. Telescoped within this tube 117, there is a tube 121 having a bore 122 with a lateral opening 123 at its upper end which has a mating surface 124 along a conical seat to seal the two telescoping tubes when in the lower position shown in full lines in FIGURE 9. This tube 121 is reduced as at 126 to provide a neck portion to which the valve lifter or flange 125 is assembled. This valve lifter is of a size to be engaged with a cup or drinking vessel to push the tube 121 upwardly. Generally this valve lifter is a solid hub 127 (FIG. 14) with radiating spokes 128 here shown as four in number. Between these spokes the hub is slotted as at 129 in a size substantially the maximum diameter of the tube 121. Along the axial dimension of the hub, there is a smaller shoulder 145 projecting into this slot at the location of the neck 126 and on this shoulder a U-shape spring 146, as seen in FIG. 15, is mounted with its flanges 147 and 148 extending radially over the upper and lower ends of the shoulder while its rounded ends 149 and 150 provide a mouth to receive the narrow neck 126 so that when the spring is assembled in the lifter, it may be pushed on to or off of the tube neck 126. A flange or lifter 125 is thus fixed to the lower end of the tube 121 against which a suitable drinking container may be placed to push the tube 121 upwardly and allow liquid to pass through opening 123 and 122 into the container for dispensing.

Each tank is provided at its upper or top wall 130 with an opening through the top wall designated 130' and this opening is closed by a double wall transparent closure 131 providing a space 132 between walls to prevent the transmission of heat through this closure. A unit comprising a casing 46 rests on top of the tanks 37 and 38 and may be removed as a unit therefrom for filling or removal of the tanks.

This unit comprises a bottom wall 151 and has opening to receive the closure 131 and locate the unit in position. This wall 151 is held to the top of the casing by bolt 165 and the wall carries means for making electrical connection with a source of electrical energy which is supplied through a hollow post 47. The wall 151 carries a plate of insulating material 152 (FIG. 13) in which contact plungers 153 and 154 are slidably mounted and urged downwardly by compression springs encircling them. Conducting wires 155, 156 extend from these contacts to the electrical mechanism in the casing 46. The post 47 has a plastic plug 157 inserted in its upper end with spaced metal contacts 158, 159 therein in a position to be engaged by the contact plungers 153 and 154. Wires 160, 161 lead to a source of electrical energy and are secured to their contacts 158, 159.

The post 47 at its lower end telescopes over a hollow stand 162 having base 163 which is mounted on the top wall 22 and the post 47 is surrounded by the raised collar 164 of the condensate tray 32.

In this casing 46 there is a lamp 133 which has a rather sharp focus to direct light downwardly through the liquid 134 to be dispensed. This light is held to the casing by brackets 135 and also is provided with an area 136 to give off light laterally so as to illuminate a transparent portion 137 of the flange of the casing 46. An electric circuit is provided to provide low voltage, that is, lower than 29.9 volts to prevent electrical shocks to persons who might come in contact therewith. The lamp 133 is of high power being substantially 770 foot candle power for the results desired. As substantial heat is generated by such lamps, a ventilator 138 is provided over each of the lamps to exhaust the heat from the casing 46. This same electrical system may be used to drive a motor 139 which is geared down to slowly rotate shaft 140 carrying sign 141 extending upwardly from the middle of the casing 46 for attracting attention to the liquid dispenser.

A drip container 142 may be located beneath each of the dispensing valves 115 to catch any spillage which might accidentally occur.

I claim:
1. A cold drink dispenser comprising a supporting stand, a storage tank having a horizontal section of oval shape with two foci mounted thereon, said tank being symmetrical about a vertical axis with a chamber bulging outwardly horizontally at one end of the oval from the periphery of the tank and in open communication with the tank, a rotor having an axis at the mid point between the foci of said tank and so proportioned as to the liquid propelled as to cause a vortex to be formed in the surface of the liquid for swirling the liquid in said tank in one direction about a vertical axis and causing the liquid through centrifugal force to sweep the sides of the tank and to enter said chamber and swirl in an opposite direction therein and a valve located in the bottom of said chamber for withdrawing liquid from the tank at the location of said chamber.

2. A cold drink dispenser as in claim 1 wherein said rotor is proportioned to the quantity of the liquid propelled so as to cause a traveling vortex to be formed in the surface of the liquid.

3. A cold drink dispenser as in claim 1 wherein a refrigeration unit is mounted on said stand having a single conduit for both tanks, said conduit being disposed with coils intermediate the ends of the conduit in heat exchange relation with one tank and coils ahead of and back of said intermediate coils in a series relation with said conduit and in heat exchange relation with the other tank.

4. A cold drink dispenser as in claim 3 wherein the coils in heat exchange relation with each tank are in substantially the same heat exchange relation and thus in balance so that the temperature of the two tanks is kept substantially the same.

References Cited in the file of this patent

UNITED STATES PATENTS

| | | |
|---|---|---|
| 1,231,602 | Hart | July 3, 1917 |
| 1,654,841 | Smith | Jan. 3, 1928 |
| 1,796,916 | Bonnheim | Mar. 17, 1931 |
| 2,134,787 | Hartman | Nov. 1, 1938 |
| 2,150,792 | Willat | Mar. 14, 1939 |
| 2,160,184 | Wilhelm | May 30, 1939 |
| 2,188,216 | Beecher | Jan. 23, 1940 |
| 2,540,957 | Newton | Feb. 6, 1951 |
| 2,716,535 | Ehlka | Aug. 30, 1955 |
| 2,734,357 | Fischer et al. | Feb. 14, 1956 |
| 2,745,641 | Jacobs | May 15, 1956 |
| 2,775,877 | Bruntjen | Jan. 1, 1957 |